US012413922B1

(12) United States Patent
Johnson et al.

(10) Patent No.: US 12,413,922 B1
(45) Date of Patent: Sep. 9, 2025

(54) METHOD AND SYSTEM FOR PROCESSING HEAD-RELATED TRANSFER FUNCTIONS

(71) Applicant: Apple Inc., Cupertino, CA (US)

(72) Inventors: Martin E. Johnson, Los Gatos, CA (US); Juha O. Merimaa, San Mateo, CA (US); Scott A. Wardle, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 17/937,693

(22) Filed: Oct. 3, 2022

Related U.S. Application Data

(60) Provisional application No. 63/252,077, filed on Oct. 4, 2021.

(51) Int. Cl.
*H04S 7/00* (2006.01)
*H04S 1/00* (2006.01)

(52) U.S. Cl.
CPC ................ *H04S 1/002* (2013.01); *H04S 7/30* (2013.01); *H04S 2420/01* (2013.01)

(58) Field of Classification Search
CPC . H04S 7/308; H04S 7/307; H04S 7/00; H04S 1/002; H04S 2420/01; H04S 7/30; H04S 7/303
USPC .................................... 381/17, 309–310, 27
See application file for complete search history.

(56) References Cited

U.S. PATENT DOCUMENTS

| | | | | |
|---|---|---|---|---|
| 10,225,682 | B1 * | 3/2019 | Lee | H04R 5/04 |
| 10,559,291 | B2 * | 2/2020 | Woelfl | H04R 3/02 |
| 10,609,504 | B2 * | 3/2020 | Park | G10L 21/02 |
| 11,122,384 | B2 * | 9/2021 | Yadegari | H04S 3/008 |
| 11,228,857 | B2 * | 1/2022 | Hassager | H04S 7/304 |
| 11,706,582 | B2 * | 7/2023 | Riggs | H04R 5/033 381/303 |

* cited by examiner

*Primary Examiner* — Disler Paul
(74) *Attorney, Agent, or Firm* — Aikin & Gallant, LLP

(57) ABSTRACT

A method performed by a programmed processor of an audio system, the method includes retrieving a head-related transfer function (HRTF) dataset from memory, processing the HRTF dataset to remote comb filtering effects during audio playback; applying, to each HRTF in the processed HRTF dataset, a gain to increase a magnitude of the HRTF at a frequency range; and storing the processed HRTF dataset in memory.

22 Claims, 7 Drawing Sheets

METHOD AND SYSTEM FOR PROCESSING HEAD-RELATED TRANSFER FUNCTIONS

This application claims the benefit of U.S. Provisional Patent Application No. 63/252,077, filed on Oct. 4, 2021, which application is incorporated herein by reference.

FIELD

An aspect of the disclosure relates to processing head-related transfer functions for reducing comb filtering effects during audio playback.

BACKGROUND

Spatial audio can be rendered using headphones that are worn by a listener. In particular, headphones may reproduce a spatial audio signal to simulate a soundscape around the listener. An effective spatial sound reproduction can render sounds such that the user perceives the sound as coming from a location within the soundscape external to the listener's head, just as the listener would experience the sound if encountered in the real world.

SUMMARY

An aspect of the disclosure is a method performed by a programmed processor of a system that includes a (e.g., a remote electronic) server. The system retrieves a head-related transfer function (HRTF) dataset from memory (e.g., of the server), and processes the HRTF dataset to remove comb filtering effects during audio playback. For instance, the server may apply one or more signal processing operations, such as an all-pass filter to adjust phase between one or more HRTFs. The server applies, to each HRTF in the processed HRTF dataset, a gain to increase a magnitude of the HRTF (e.g., response) at a frequency range. In one aspect, the gain increase may be between 3 dB and 6 dB, where the frequency range is between 900 Hz and 1,600 Hz. In some aspects, the gain is applied to each HRTF in the frequency range. In some aspects, an average response across at least a subset of the processed HRTFs includes at least a portion of the gain increase across the frequency range.

According to another aspect of the disclosure, a method performed by the system includes retrieving a HRTF dataset that includes a set of HRTF pairs for a set of angles from (or with respect to) a reference point. The system processes each pair of HRTFs such that each pair of HRTFs is phase shifted by a predetermined amount of phase across the set of angles, and stores the processed pairs of HRTFs in memory.

In one aspect, processing each pair of HRTFs includes creating a first set of phase-shifted HRTF pairs in which each pair of HRTFs is out-of-phase by a first threshold (e.g., 90°), and creating a second set of phase-shifted HRTF pairs in which each pair of HRTFs is out-of-phase by a second threshold that is greater than the first threshold, such as 180°. In another aspect, sound produced during spatial audio playback according to the first set of phase-shifted HRTF pairs has a greater sound level than a sound level of sound produced during spatial audio playback according to the second set of phase-shifted HRTF pairs.

In some aspects, the set of HRTF pairs includes a first subset of pairs of HRTFs for right-sided angles with respect to the point of reference (e.g., angles between 0° and 180° along an axis that extends forward from the point of reference or listener) and a second subset of pairs of HRTFs for left-sided angles with respect to the point of reference (e.g., angles between 0° and −180° along the axis). In some aspects, processing each pair of HRTFs includes processing the set of HRTF pairs such that phase of all right HRTFs of the first subset of pairs of HRTFs are the same for the right-sided angles, and such that phase of all left HRTFs of the second subset of pairs of HRTFs are the same for the left-sided angles. In another aspect, the system processes all left HRTFs of the first subset of pairs of HRTFs to maintain relative phase between all right HRTFs and all left HRTFs of the first subset, and processes all right HRTFs of the second subset of pairs of HRTFs to maintain relative phase between all left HRTFs and all right HRTFs of the second subset. In another aspect processing each pair of HRTFs includes phase shifting all of the left HRTFs of the first subset of pairs such that phase differences between the left HRTFs of the first subset and left HRTFs of the second subset are the same, and phase shifting all of the right HRTFs of the second subset of pairs of HRTFs such that phase differences between the right HRTFs of the second subset and the right HRTFs of the first subset are the same.

In one aspect, each pair of HRTFs is phase shifted above a particular frequency, which is within a frequency range of 800 Hz to 1,400 Hz.

According to another aspect of the disclosure, a method performed by a system that receives a HRTF dataset, processes a first portion of the HRTF dataset to remove comb filtering effects during audio playback for a first subset of angles, processes a second portion of the HRTF dataset to localize hard-panned left sound sources or hard-panned right sound sources for a second subset of angles, and stores the first and second portions of the HRTF dataset in memory. In one aspect, the first subset of angles is between −30° and +30°. In another aspect, the second subset of angles is between −90° and −30°, and between +90° and +30°. In some aspects, processing the second portion of the HRTF dataset to localize includes increasing a target phase difference between at least some HRTFs of the second portion of the HRTF dataset when the subset of angles moves between −90° and −30°, and between +90° and +30°.

In another aspect, the system applies, to each HRTF in the dataset, a gain to increase a magnitude of the HRTF at a frequency range. In another aspect, the gain is applied to the second portion of the HRTF dataset as a function of the second subset of angles. In one aspect, the system increases phase crossover frequency for the second subset of angles. In some aspects, the system changes phase crossover frequency based on a set of elevation angles.

In one aspect, the HRTF dataset includes pairs of HRTFs comprising a first subset of pairs of HRTFs for right-sided angles with respect to the point of reference and a second subset of pairs of HRTFs for a left-sided angles with respect to the point of reference, where each pair of HRTFs comprises a left HRTF and a right HRTF. In some aspects, the system applies an attenuation to each right HRTF of the second subset of pairs of HRTFs and applies the attenuation to each left HRTF of the first subset of pairs of HRTFs.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Figure 1A:
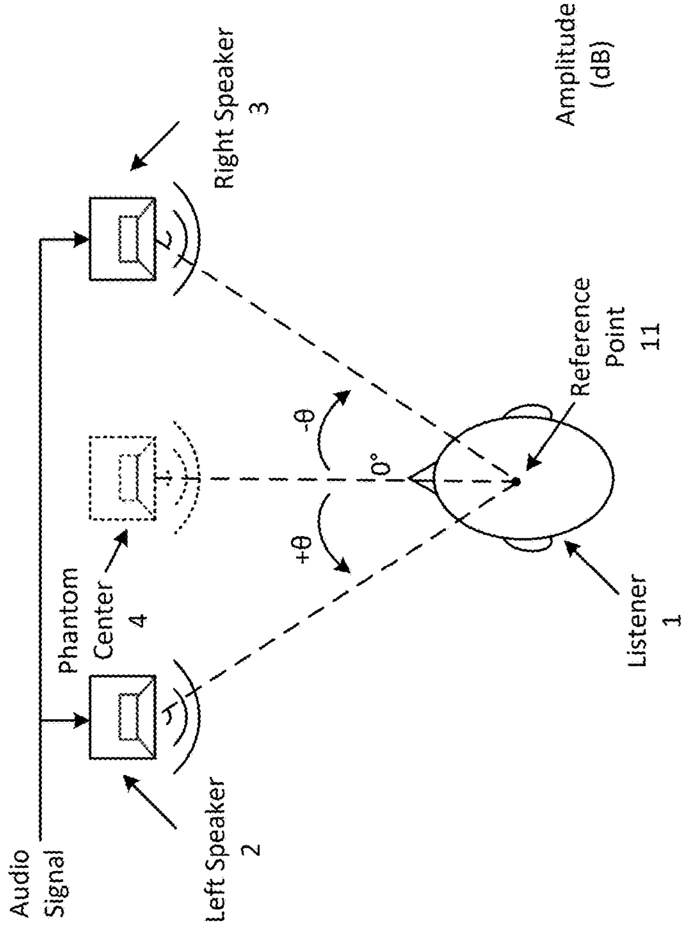
FIGS. 1*a* and 1*b* shows the creation of a phantom center using two loudspeakers and a comb filtering effect that results from a listener being positioned symmetrically between the loudspeakers.

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

When a sound travels to a listener from a surrounding environment in the real world, the sound propagates along a direct path, e.g., through air to the listener's ear, and along one or more indirect paths, e.g., by reflecting and diffracting around the listener's head or shoulders. As the sound travels along the indirect paths, artifacts can be introduced into the acoustic signal that the ear receives. User-specific artifacts can be incorporated into binaural audio by signal processing algorithms that use spatial audio filters. For example, a head-related transfer function (HRTF) is a filter that contains all of the acoustic information required to describe how sound reflects and/or diffracts around a listener's head, torso, and outer ear before entering their auditory system.

To implement binaural reproduction, a distribution of HRTFs at different angles relative to a listener can be determined. For example, HRTFs can be measured for a person in a laboratory setting using an HRTF measurement system. A typical system includes a loudspeaker positioned statically to a side of a listener's head, and one or more microphones being positioned next (or adjacent) to the listener's ears. The loudspeaker emits sounds, which are received by the microphones and are processed by the system to generate a HRTF that may include one or more positional parameters (e.g., azimuth, elevation, etc.) that correspond to the location at which the loudspeaker is positioned with respect to the manikin's head. Meanwhile, the listener can be controllably rotated (e.g., spun on a chair) along one or more axes (e.g., a vertical axis that extends orthogonal to the direction of the emitted sounds). As the listener's head rotates, a relative angle between a direction that the listener's head is facing and the direction of the emitted sounds changes. As a result, several HRTFs may be determined that correspond to different relative angles to generate a HRTF dataset.

An HRTF selected from the generated dataset of angle-dependent HRTFs can be applied to an audio signal to shape the signal as two binaural audio signals in such a way that reproductions of the shaped signal realistically simulates a sound traveling to the listener from the relative angle at which the selected HRTF was measured, taking into account reflects and diffractions around the listener's head or shoulders. Accordingly, a listener can use simple stereo headphones by driving speakers (left and right speakers) with the binaural audio signals to create the illusion of a sound source somewhere in a listening environment by applying the HRTF to the audio signal of the sound source.

Figure 1B:
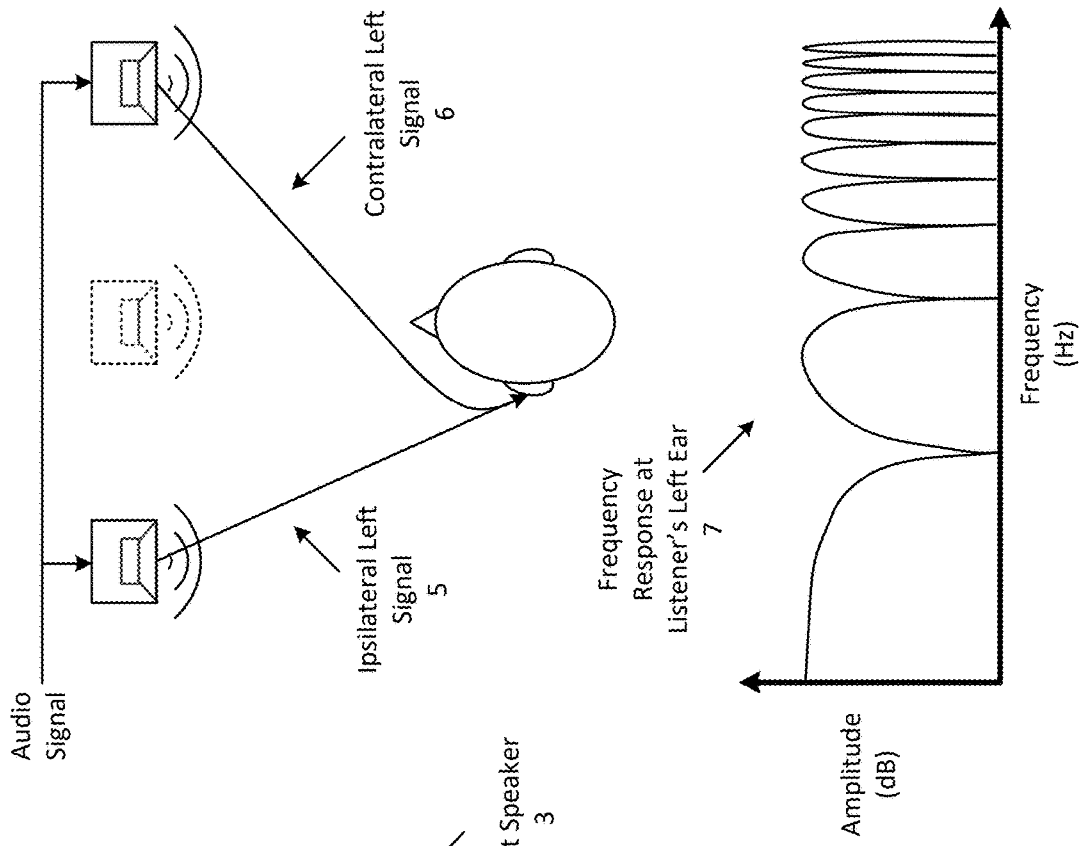

FIGS. 1*a* and 1*b* shows the creation of a phantom center 4 using two loudspeakers (a left speaker 2 and a right speaker 3), and a comb filtering effect that results from a listener being positioned symmetrically between the speakers. Specifically, FIG. 1*a* shows an example of the two speakers (e.g., standalone speakers that may be a part of a home theater system) producing a phantom center 4, which is a virtual sound source that is perceived by the listener 1 to originate between the two sound sources, which in this case is the left speaker 2 and the right speaker 3. Specifically, to create the phantom center 4, both speakers are driven by the same audio signal, as shown in this figure (or may both be driven by two individual audio signals that are at least partially coherent to one another), which results in the phantom center 4 being positioned in the middle of both speakers. In one aspect, the phantom center may be positioned in different locations between both speakers (e.g., along a horizontal axis) based on differences between audio signals used to drive the respective loudspeakers. For instance, a gain adjustment (e.g., increased gain) applied to the audio signal used to drive the left speaker 2 with respect to an audio signal used to drive the right speaker 3 may cause the phantom center 4 to move towards the left speaker.

In one aspect, a phantom center may be used (e.g., by an audio system) in lieu of a center channel, such as a center channel in surround sound multi-channel format audio (e.g., 5.1, 7.1, etc.), which may be used to drive a center channel speaker. Thus, the phantom center may include audio content that may normally be included within a center channel, for example the audio signal used to drive both speakers may include dialogue of a movie.

As shown, the listener 1 is positioned in front of (e.g., and at a particular distance from) the phantom center 4 such that the listener is positioned symmetrically in the middle of the two speakers 2 and 3. Specifically, a 0° axis extends frontward from (e.g., a point of reference 11 at) the listener's position, where the axis is positioned in the middle of both speakers. In addition, both speakers are separated by a same angle, $\theta$, with respect to the listener, such that the right speaker 3 is at $-\theta$ from the 0° axis with respect to the reference point 11, and the left speaker 2 is at +θ from the 0° axis with respect to the reference point. With the listener positioned symmetrically between the two speakers and having both speakers driven by the (e.g., same) audio signal, the listener perceives the phantom center 4 as being right in front of the listener, as shown.

FIG. 1*b* shows a comb filtering effect that results from the listener being positioned symmetrically between the speakers (e.g., where the listener is positioned such that both speakers are at +/−θ, as described herein). Specifically, this figure is showing a comb filtering effect that is occurring at the listener's left ear due to a delayed version of the audio signal being produced by the right speaker 3 being combined with itself (e.g., combined with the audio signal being produced by the left speaker 2), causing constructive and destructive interference. In one aspect, although illustrated as occurring at the listener's left ear, this comb filtering effect may also occur at the listener's' right ear. In this example, due to the listener being positioned symmetrically between (and in front of) the two speakers, a contralateral left signal 6 produced by the right speaker arrives to the listener's left ear after the ipsilateral left signal 5, due to having to travel around the listener's head. As a result, the frequency response 7 at the listener's left ear shows large dips (or notches) caused when the two signals are summed together and out of phase, giving the appearance of a comb. As described herein, the same comb filtering effect may occur at the listener's right ear, due to sound of the left speaker (e.g., a contralateral right signal) traveling further than the sound (e.g., an ipsilateral right signal) of the right speaker traveling towards the listener's right ear.

The comb filtering effect may be less perceived (or unnoticeable) by the listener 1, while listening to the speakers in a physical environment (e.g., while the listener is listening to sound being played back by a home theater system within a living room). For example, movements and rotations by the listener (e.g., head movements), e.g., due to natural moving and shifting about, changes the delays (and hence phase) between the ipsilateral left signal and contralateral left signal, and therefore causes the position and depth of the notches of the summed signals to change. As a result, the comb filtering effect may be unnoticeable by the listener and may perceive the phantom center as being spectrally flat, which is preferable. In addition to head movements, the listener may be less susceptible to this effect when not sitting directly in the middle of both sound sources.

The perception of the comb filtering effect, however, may be more apparent to a listener who is listening to a spatial audio rendering of a virtual phantom center. For example, a virtual phantom center may be created by applying spatial filters, such as HRTFs, to an audio signal, and playing back the spatial audio (e.g., as binaural audio signals) over a headset (e.g., over-the-ear headphones). In cases where there is no head tracking or where tracking only accounts for rotations of the head, the listener may be "locked" in a perfectly center position (e.g., symmetrically positioned) between two sound sources (e.g., a virtual left speaker and a virtual right speaker) with output that is producing a virtual phantom center. As a result, the comb filtering effect that may be otherwise unnoticeable in a physical setting, may be more apparent to the listener who is listening to a spatial audio rendering of the phantom center. In addition, this may cause central parts of the audio, for example a lead vocal, to become quieter in the mix (relative to other instruments) and to sound filtered. Therefore, there is a need for alleviating comb filtering that occurs when producing a virtual phantom center using spatial audio rendering, while preventing degradation of a spatial audio reproduction.

To overcome these deficiencies, the present disclosure describes a system for processing HRTFs to eliminate (or remove) the comb filtering effect when used to produce spatial audio. Specifically, the system may adjust the response associated with the HRTF in order to reduce the comb filtering impact upon the spatial audio. However, the processing of the HRTFs may impact localization of signals played purely through a left or right channel (e.g., a left or right virtual sound source), and not a virtual phantom center. To alleviate this impact, the system may apply one or more signal processing operations upon the HRTFs. For example, the system may apply, to each processed HRTF, a gain to increase a magnitude of the HRTF at a frequency range (e.g., between 900 and 1,600 Hz. In another aspect, the system may apply other operations or processes in order to remove the comb filtering effect and/or any impacts that such processes may have on localization. More about these operations are described herein. Also, the system may store the processed HRTFs in memory, which may be used by one or more electronic devices for spatially rendering audio.

Figure 2:
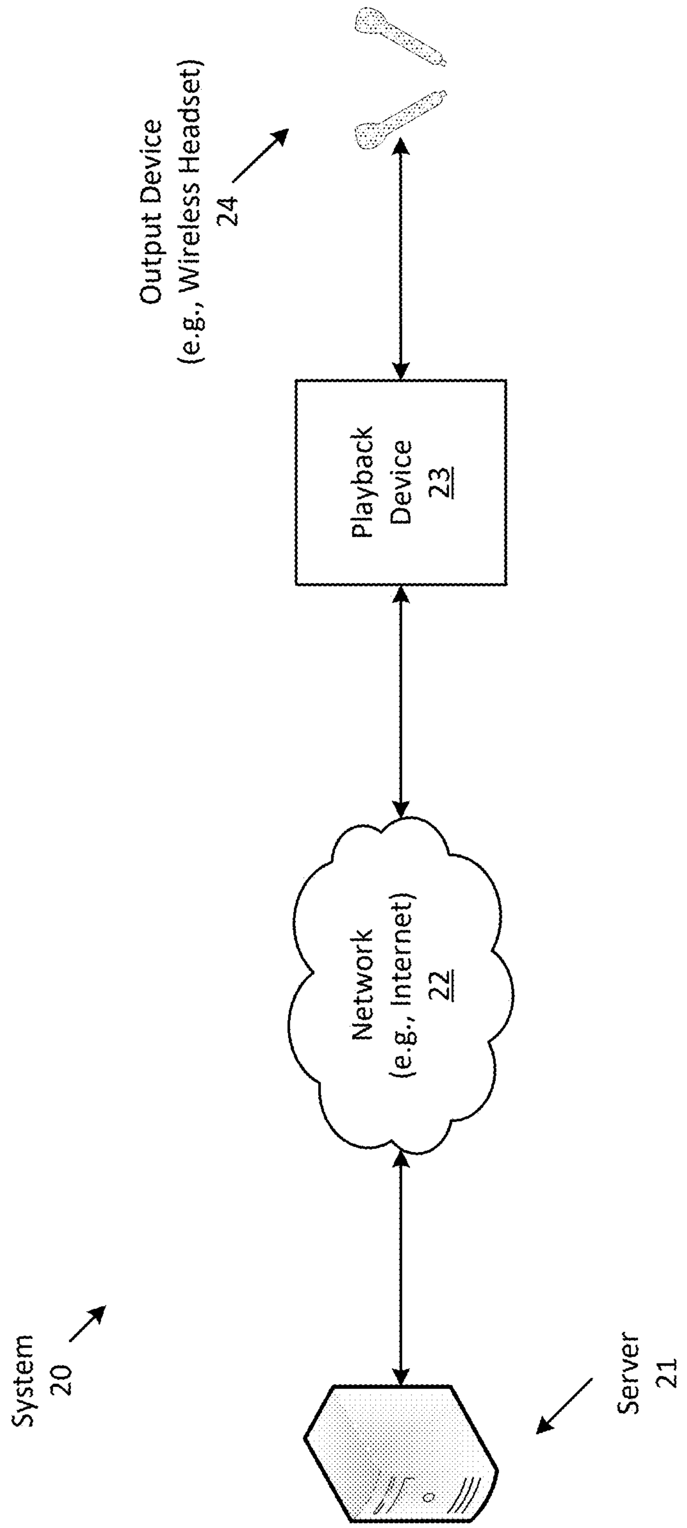
FIG. 2 shows a block diagram of a system that includes a server for processing head-related transfer functions (HRTFs) to eliminate the comb filtering effect when used by the system to produce spatial audio according to one aspect.

FIG. 2 shows a block diagram of a system 20 that includes a server 21 for processing head-related transfer functions (HRTFs) to eliminate the comb filter effect when used by the system to produce spatial audio according to one aspect. Specifically, the system includes a playback device 23, an output device 24, a (e.g., computer) network (e.g., the Internet) 22, and a server 21. In one aspect, the system may include more or fewer elements, such as having additional servers, or not including a playback device. In which case, the output device may be (e.g., directly) communicatively coupled to the server, as described herein.

In one aspect, the server may be a stand-alone electronic server, a computer (e.g., desktop computer), or a cluster of server computers that are configured to perform digital signal processing upon one or more HRTFs of one or more HRTF datasets, as described herein. In which case, the server may be a part of a cloud computer system that is capable storing and processing HRTFs by performing one or more operations, and storing the processed HRTFs (e.g., for transmission to one or more other electronic devices, such as the playback device 23 for use in spatial audio playback). As shown, the server is communicatively coupled (e.g., via the Network 22) to the playback device in order to provide digital data (e.g., processed HRTFs). More about the operations performed by the server is described herein.

In one aspect, the playback device may be any electronic device (e.g., with electronic components, such as a processor, memory, etc.) that is capable of spatially rendering audio content using one or more spatial filters (such as HRTFs) for audio playback (e.g., via one or more speakers that may be integrated within the playback device and/or within the output device, as described herein). For example, the playback device may be a desktop computer, a laptop computer, a digital media player, etc. In one aspect, the device may be a portable electronic device (e.g., being handheld operable), such as a tablet computer, a smart phone, etc. In another aspect, the device may be a head-mounted device, such as smart glasses, or a wearable device, such as a smart watch.

In one aspect, the output device 24 may be any electronic device that includes at least one speaker and is configured to output (or playback) sound by driving the speaker. For instance, as illustrated the device is a wireless headset (e.g., in-ear headphones or wireless earbuds) that are designed to be positioned on (or in) a user's ears, and are designed to output sound into the user's ear canal. In some aspects, the earbuds may be a sealing type that has a flexible ear tip that serves to acoustically seal off the entrance of the user's ear canal from an ambient environment by blocking or occluding in the ear canal. As shown, the output device includes a left earbud for the user's left ear and a right earbud for the user's right ear. In this case, each earbud may be configured to output at least one audio channel of audio content (e.g., the right earphone outputting a right audio channel and the left earphone outputting a left audio channel of a two-channel input of a stereophonic recording, such as a musical work). In another aspect, each earbud may be configured to playback one or more spatially rendered audio signals. In which case, the output device may playback binaural audio signals produced using one or more HRTFs, where the left earbud plays back a left binaural signal, while the right earbud plays back a right binaural signal. In another aspect, the output device may be any electronic device that includes at least one speaker and is arranged to be worn by the user and arranged to output sound by driving the speaker with an audio signal. As another example, the output device may be any type of headset, such as an over-the-ear (or on-the-ear) headset that at least partially covers the user's ears and is arranged to direct sound into the ears of the user.

In some aspects, the output device may be a head-worn device, as illustrated herein. In another aspect, the audio output device may be any electronic device that is arranged to output sound into an ambient environment. Examples may include a stand-alone speaker, a smart speaker, a home theater system, or an infotainment system that is integrated within a vehicle.

As described herein, the output device may be a wireless headset. Specifically, the output device may be a wireless device that may be communicatively coupled to the playback device in order to exchange digital data (e.g., audio data). For instance, the playback device may be configured to establish the wireless connection with the output device via a wireless communication protocol (e.g., BLUETOOTH protocol or any other wireless communication protocol). During the established wireless connection, the playback device may exchange (e.g., transmit and receive) data packets (e.g., Internet Protocol (IP) packets) with the output device, which may include audio digital data in any audio format.

In another aspect, the playback device may communicatively couple with the output device via other methods. For example, both devices may couple via a wired connection. In this case, one end of the wired connection may be (e.g., fixedly) connected to the output device, while another end may have a connector, such as a media jack or a universal serial bus (USB) connector, which plugs into a socket of the playback device. Once connected, the playback device may be configured to drive one or more speakers of the output device with one or more audio signals, via the wired connection. For instance, the playback device may transmit the audio signals as digital audio (e.g., PCM digital audio). In another aspect, the audio may be transmitted in analog format.

In some aspects, the playback device and the output device may be distinct (separate) electronic devices, as shown herein. In another aspect, the playback device may be a part of (or integrated with) the output device. For example, at least some of the components of the playback device (such as one or more processors, memory, etc.) may be part of the output device, and/or at least some of the components of the output device may be part of the playback device. In which case, at least some of the operations performed by the playback device may be performed by the output device.

Figure 3:
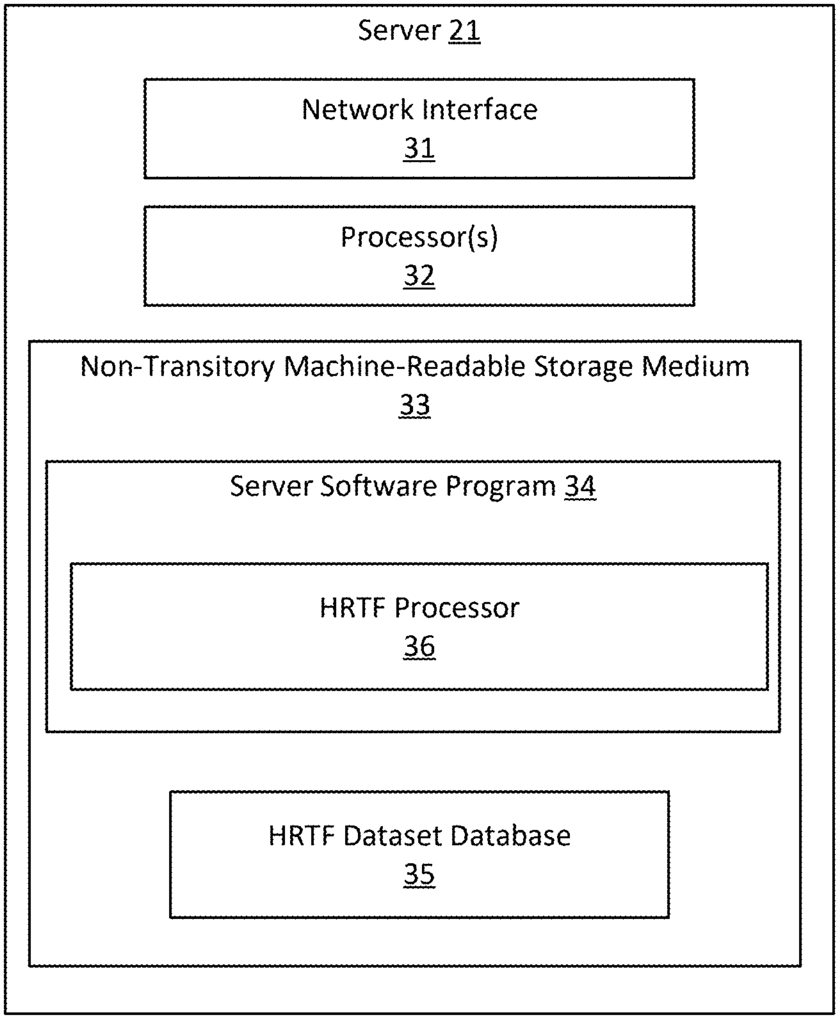
FIG. 3 shows an example of the server according to one aspect.

FIG. 3 shows an example of the server 21 according to one aspect. In one aspect, the server may be operated by one or more online service providers, and is capable of providing one or more HRTF datasets to one or more electronic devices (e.g., the playback device 23 and/or the output device 24), for the devices to perform spatial audio playback. For example, the server may receive a request (e.g., via Network 22) from an electronic device, such as the playback device 23, for one or more (processed) HRTF datasets. The server may transmit the datasets as one or more data packets (e.g., Internet Protocol (IP) packets) to the requesting device. In addition, the server may be configured to process one or more HRTFs (and/or HRTF datasets) to remove comb filtering effects. More about the server processing HRTFs is described herein.

The server includes a network interface 31, one or more processors 32, and a non-transitory machine-readable storage medium 33 (or memory). The network interface 31 provides an interface for the server 21 to communicate with electronic devices, such as the playback device. For example, the network interface is configured to establish a communication link with the playback device, and once established transmits the digital data, as described herein. Examples of non-transitory machine-readable storage medium may include read-only memory, random-access memory, CD-ROMS, DVDs, magnetic tape, optical data storage devices, flash memory devices, and phase change memory. Although illustrated as being contained within the server, one or more of the components may be a part of separate electronic devices, such as the medium 33 being a separate data storage device. For example, the storage medium may be a part of (or contain) an online database with which the server is communicatively coupled. As shown, the non-transitory machine-readable storage medium has stored therein a server software program 34 and a HRTF dataset database 35 that is configured to store one or more HRTF datasets.

The HRTF datasets in the database 35 may include one or more HRTF datasets of angle-dependent HRTFs, which provide spatial cues for sound source localization in order to make one or more sounds (e.g., audio signals) appear to originate from a particular location in space. For example, a HRTF dataset may include a set of HRTFs for a set of angles) from a reference point (e.g., azimuth with respect to an orthogonal axis that runs through the reference point and/or elevation). In one aspect, the HRTF dataset may include pairs of HRTFs, each pair associated with one or more angles that when applied to an audio signal produce binaural audio signals. For example, each pair may include a left HRTF for a listener's left ear and a right HRTF for a listener's right ear, which when applied to one or more audios signals produces a left binaural audio signal and a right binaural audio signal for driving a left speaker and a right speaker, respectively.

In some aspects, at least some of the datasets may be predefined (or generated) in a controlled environment (e.g., a laboratory). In one aspect, the HRTF dataset(s) may be generic and/or individualized for one or more listeners. For example, a HRTF dataset may be generated for listener 1 of FIGS. 1*a* and 1*b*. In another aspect, the server may store one or more processed HRTF datasets in memory 33, as described herein.

The server software program 34, which when executed by the one or more processors 32 of the content server performs audio signal processing operations to process HRTFs, includes at least one operational blocks, such as HRTF processor 36. In one aspect, the server software program may include more operational blocks. In another aspect, at least some of the operations described herein may be performed by one or more other electronic devices that are communicatively coupled with the server. For example, the playback device 23 and/or the output device 24 may be configured to perform one or more HRTF processing operations described herein. In particular, the playback device 23 may include (at least a portion of) the HRTF dataset database, and may include a software program with the HRTF processor operational block to perform at least some of the operations described herein.

The HRTF processor 36 is configured to retrieve at least some of an HRTF dataset from the database 35, and is configured to process at least some of the HRTF dataset to remove comb filtering effects during audio playback. Specifically, the software program may perform one or more signal processing operations (e.g., applying one or more linear filters, such as a low-pass filter, a high-pass filter, a band-pass filter, an all-pass filter, etc., and/or, one or more scalar gains) upon the HRTFs to adjust the HRTFs' responses. When the processed HRTFs are applied to one or more audio signals by an electronic device, such as the playback device 23, to spatially render a phantom center, there is a reduction or elimination of comb filtering effects.

As described herein, an audio signal may be spatially rendered by a pair of HRTFs, such that two virtual sound sources are created symmetrically about the listener. This results in a creation of a virtual phantom center that is (virtually) located in front of the listener when the spatially rendered audio signal is used to drive one or more speakers. Due to the HRTFs taking into account anthropometrics features (e.g., size, shape, etc. of the user's head), contralateral signals of each ear will have delays with respect to ipsilateral signals. As described herein, this results in a response at each of the user's ears having many notches (resembling a comb). In one aspect, the HRTF processing reduces or eliminates these notches, resulting in an (e.g., almost) flat response at each of the user's ears.

Figure 7:
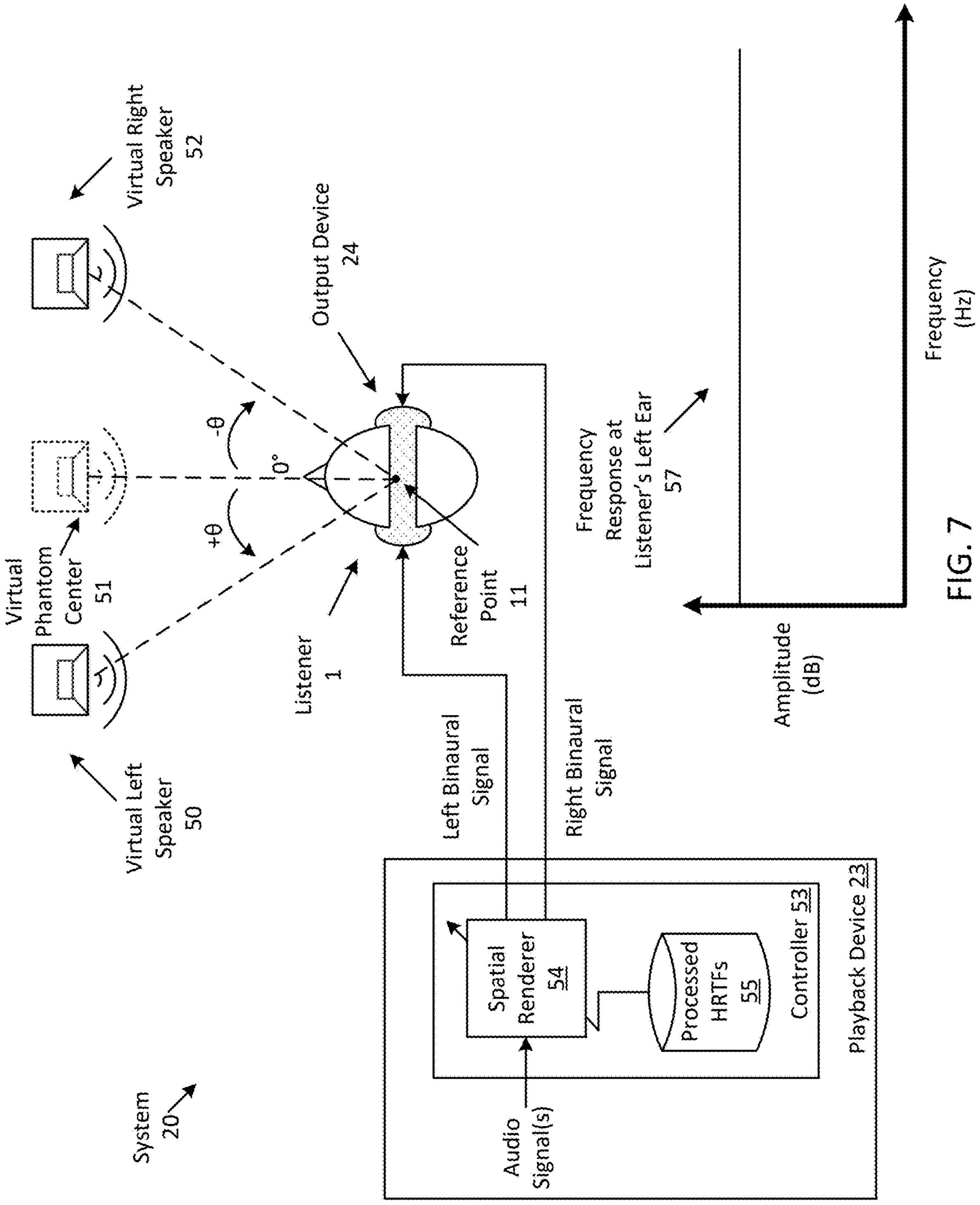
FIG. 7 shows an example of a system that is using one or more processed HRTFs to eliminate the comb filtering effect during reproduction of spatial audio with a virtual phantom center.

In one aspect, the software program 34 may apply additional signal operations upon the (processed) HRTF dataset. For example, the program may apply, to each HRTF (e.g., in each pair of HRTFs that is associated with one or more angles/locations in space) in the processed HRTF dataset, a gain to increase a magnitude of the HRTF (response) at one or more frequency ranges. In one aspect, the applied gain may compensate for degradation in localization of signals of hard-panned sound sources that may be played (e.g., only) through one of one or more audio channels (or driver signals) that are used to drive one or more speakers (e.g., of the output device). For example, the processing of the HRTF to remove the comb effects may cause a sound source that is only played through a left virtual speaker (e.g., speaker 50, as shown in FIG. 7), to have its location as perceived by the listener shifted during audio playback. In one aspect, the gain may be used to resolve a dip in the HRTF response caused by altering high frequency content while removing the comb effect.

The gain increase may be a predefined value. For example, the system may apply a full gain of 6 dB at (or at approximately) 1500 Hz for all HRTFs. Applying a gain to all HRTFs may affect an average response of the HRTF dataset. For example, an average (e.g., diffuse field) response across at least a subset of the processed HRTFs may include at least a portion of the gain increase in the frequency range (at which the gain was applied to the one or more HRTFs) for a range of angles. In one aspect, the gain increase to the average may be equal to or less than the gain increase applied to the processed HRTFs. This is in contrast to an average response across an HRTF dataset to which no gain increase was applied, which may be more spectrally flat.

In another aspect, the applied gain (and/or other processes performed) may be observed during spatial audio playback of an audio signal (e.g., a test signal) using one or more of the processed HRTFs. For example, a multichannel file (e.g., a 7.1.4 virtual file) may playback a sound (e.g., noise or impulse) from each channel in sequence, and the audio playback may be recorded through a headphone's left and right channels. As another example, a signal through one channel of the multi-channel file may be played back (spatially rendered through the headphones), and then the headphone may be rotated a known amount. With head tracking, the applied HRTFs may be adapted based on the rotation, and the output may be observed to determine how sound output changes.

Applying a full gain may also boost hard-panned signals which rely on only one HRTF (e.g., a left HRTF when a signal is panned to the left). Consequently, the system may instead apply only a partial gain at a particular frequency. In one aspect, the system may only apply a 3 dB gain at 1500 Hz. In such a case, the 3 dB gain reduces the dip in the phantom center response from 6 dB to 3 dB and adds an undesirable 3 dB boost to the hard panned signal. However, this can still be an improvement over adding a full 6 dB gain or not adding a gain at all.

Persons skilled in the art will appreciate that the partial gain may be any suitable value such as, for example, between 3 dB and 6 dB. As described herein, the gain increase may be applied to a frequency range. In one aspect, the frequency range may be equal to or less than a frequency range along which the HRTFs are processed to remove the comb filtering effect during audio playback. In another aspect, the frequency range to which the gain is applied may be between 900 Hz and 1,600 Hz, and the gain may be applied to each HRTF in the frequency range. In one aspect, the gain may be applied above (or at) a cross-over frequency at (and/or above) which the HRTFs are processed (e.g., beginning at which one or more linear filters are applied across one or more frequency ranges). In another aspect, the gain may be applied as a function of frequency along the frequency range. More about applying the gain as a function of frequency is described herein.

Additionally or alternatively, the HRTF processor 36 may process one or more pairs of HRTFs of a dataset by applying one or more phase shifts (e.g., adding non-zero phase targets) to HRTFs to adjust high frequency (e.g., above a frequency threshold) amplitude of the phantom center relative to hard panned content. In one aspect, if the phase difference between two signals is zero, then they add "coherently" which means the two amplitudes add together. If, however, the two signals are out of phase, the two amplitudes subtract. Therefore, phase shifts may be applied to one or more pairs of HRTFs such that they (e.g., spatially rendered signals based on the processed HRTFs add in different ways) add in different ways.

As described herein, the HRTF dataset may include a set of HRTF pairs (e.g., each pair having a left HRTF and a right HRTF) that provide spatial cues for sound sources to appear to originate from different locations (e.g., about a listener) in space. In one aspect, the set of HRTF pairs may be for a set of angles about a reference point (e.g., along a 0° axis). For example, the set of HRTF pairs may include a first subset of pairs of HRTFs for right-sided angles (e.g., azimuth angles between a 0° front axis to −180°), that are used to spatially render sound sources on a right side of the listener (e.g., a right side of the 0° axis that runs symmetrically through the listener 1, as shown in FIG. 1), and may include a second subset of pairs of HRTFs for left-sided angles (e.g., azimuth angles between the 0° to 180°), that are used to spatially render sound sources on a left side of the listener (e.g., a left side of the 0° axis). Consequently, a right HRTF of a pair of HRTFs from the first subset is an ipsilateral HRTF (filter) with respect to the user's right ear, and a left HRTF of the same pair is a contralateral HRTF (filter) with respect to the user's left ear. When the pair is used to spatially render an audio signal at a corresponding location (e.g., along a right side of the listener), the application of the right HRTF produces an ipsilateral audio signal (e.g., that is produced by a speaker that is arranged to project sound into the user's right ear), while the application of the left HRTF produces a contralateral audio signal (e.g., that is produced by the speaker that is arranged to project sound directed towards the user's left ear). In some aspects, to create the virtual phantom center, a pair of HRTFs of the first subset may be used to spatially render a right-sided sound source (e.g., a virtual right speaker) and another pair of HRTFs of the second subset may be used to spatially render a left-sided sound source (e.g., a virtual left speaker). More about spatially rendering a virtual phantom center is described herein.

In one aspect, the pairs of HRTFs may be processed such that each pair is phase shifted by a predefined amount of phase across the set of angles. For example, the HRTF processor may process one or both HRTFs in each pair across the set of angles (e.g., which may include at least some azimuth angles between 0° to 360°) to create a set of phase-shifted HRTF pairs in which (responses of) each pair of HRTFs is out of phase by a particular threshold. In another aspect, the processor may create multiple processed HRTF datasets that are phase-shifted differently. For example, the processor may create a first set of phase-shifted HRTF pairs in a first dataset may be phase-shifted by 90°, and may create a second set of phase-shifted HRTF pairs for a second dataset that are phase-shifted by 180°.

In one aspect, each pair in a processed dataset may be phase-shifted by a same threshold. In another aspect, different pairs (e.g., for different angles) may be phase-shifted by different thresholds. For example, some pairs of the first subset HRTFs that are associated with a first range of azimuth angles may be phase-shifted by a first threshold, while other pairs of HRTFs of the second subset of HRTFs that are associated with a different range of azimuth angles may be phase-shifted differently. In one aspect, the shift in phase may be frequency dependent. For example, the phase shift may be applied along a frequency range and/or above a particular frequency.

In one aspect, phase adjustments may be performed between corresponding HRTFs in the pairs of HRTFs between the first and second subset of HRTFs. Specifically, the HRTF processor may phase shift left HRTFs of the first subset of HRTFs (which are right-sided HRTFs) with respect to left HRTFs of the second subset of HRTFs (which are left-sided HRTFs), such that left HRTFs across both subsets (e.g., across all angles) are out-of-phase by a threshold (e.g., 90°). In other words, left HRTFs across both subsets have a target phase difference of the threshold of 90°, for example. As a result, when two pairs of HRTFs (one from the first subset and one from the second subset) are used to spatially render two sound sources, respectively, to create the phantom center, ipsilateral signals and contralateral signals (with respect to the listener) are added slightly out-of-phase. For example, with respect to the user's left ear, a left binaural audio signal may include an ipsilateral spatially rendered left signal produced by a spatially rendered left-sided sound source (e.g., a left virtual speaker) that will be out-of-phase with a contralateral spatially rendered left signal produced by a spatially rendered right-sided sound source (e.g., a right virtual speaker). In addition to (or in lieu of) such a phase adjustment in the left binaural audio signal, the right binaural audio signal may also include a similar phase adjustment (e.g., an ipsilateral spatially rendered right signal produced by the right virtual speaker being out-of-phase with a contralateral spatially rendered left signal produced by the left virtual speaker).

In one aspect, the HRTF processor may apply a same (or similar) phase shift to contralateral filters as those applied to (corresponding) ipsilateral filters of one or more pairs of HRTFs. Specifically, the HRTF processor may process contralateral filters to maintain relative phase between the contralateral filters and ipsilateral filters associated with one or more HRTF pairs. For example, the HRTF processor may phase shift a right (e.g., ipsilateral) HRTF (of a first pair of HRTFs associated with a location right to the listener) of the first subset. In one aspect, this phase shift may be with respect to a right (e.g., contralateral) HRTF (of a second pair of HRTFs that are associated with a symmetrically orientated location to the left of the listener) of the second subset. In addition, the HRTF processor may apply a same phase shift to a left (e.g., contralateral) HRTF of the first pair of HRTFs to which the (original) phase shift was applied such that both HRTFs of the first pair (e.g., the pair of HRTFs associated with the location right to the listener) maintain relative phase between the ipsilateral and contralateral filters of the same pair of HRTFs. Thus, a phase shift applied to an ipsilateral HRTF of a pair of HRTFs may be applied to a corresponding contralateral HRTF of the same pair in order for phase shifts to match within a given pair. In one aspect, the applied phase shifts between HRTFs may be different, while the resulting phase between the (e.g., ipsilateral and/or contralateral) HRTFs may be the same.

In one aspect, phase-shifted HRTFs may impact spatial audio reproduction. In particular, phase-shifted HRTFs may adjust (e.g., high-frequency) amplitude of sound sources across a range of angles, while not effecting (or effecting less) sources across other angles. For example, spatial audio of a virtual phantom center produced during spatial audio playback using phase-shifted HRTFs may have a higher sound level (at the listener's ear) than spatial audio that is hard panned (e.g., a sound source that is spatialized only from either a left virtual speaker or a right virtual speaker, such as the virtual left speaker 50 and virtual right speaker 52 in FIG. 7).

In one aspect, the increase in the sound level of spatial audio may correspond to the degree at which the pairs of HRTFs are phase shifted. For example, spatial audio produced using HRTFs that are phase-shifted closer to 0° (e.g., ipsilateral and contralateral signals that are added) may have a sound level that is higher than spatial audio produced using HRTFs that are phase-shifted further away from 0° when spatially rendering two sound sources to create a virtual phantom center. This increase in sound level is due to spatial audio (ipsilateral and contralateral signals) being more in-phase, and therefore ipsilateral and contralateral signals are constructively adding more when the phase difference between the HRTFs are closer to 0°. This increase in sound level, however, does not affect hard-panned audio content, since hard-panned audio content only (or primarily) uses an ipsilateral signal (e.g., due to hard-panned content not having a contralateral signal). Thus, this technique will only affect phantom content and not hard panned content.

In one aspect, additionally or alternatively, phase for one or more HRTFs may be set to a particular threshold across a frequency range. Specifically, phase across HRTFs for a set of angles (e.g., all or some angles with respect to a reference point) may be set to a same phase across the frequency range, which may be a range between 800 Hz to 1,400 Hz. In another aspect, the phase for the one or more HRTFs may be the same above the frequency range (e.g., for spectral content above 1,400 Hz). In particular, the HRTF processor may process HRTF pairs such that phase for all right HRTFs of the first subset of pairs of HRTFs (e.g., right-sided HRTFs) are the same for (e.g., all) right-sided angles, and such that phase of all left HRTFs of the second subset of pairs of HRTFs (e.g., left-sided HRTFs) are the same for (e.g., all) left-sided angles. Thus, all ipsilateral filters (across all angles) have the same phase with respect to each other. In one aspect, the ipsilateral filters may be driven to zero for all HRTF angles (e.g., in addition to altering the relative phase between ipsilateral and contralateral sides). In one aspect, this may ensure that any coherent content played out of any two (or more) source locations may add in phase regardless of where the sources are located. In some aspects, depending on how the delays in the HRTF set are defined, the phases can vary from angle to angle. By setting all high frequency phases to zero, signals (which have coherent content) produced by speakers at different angles (e.g., where four signals at four different angles, such as −90°, −30°, +30°, and +90°) add in phase. In one aspect, the phase of all right HRTFs of the first subset and the phase of all left HRTFs of the second subset may be set to zero.

In addition to (or in lieu of) phase-shifting ipsilateral filters to have a same phase across all (or most) angles (e.g., set to zero, as described herein), the HRTF processor may adjust contralateral phase so that the phase differences between ipsilateral and contralateral filters remain the same (or similar) (e.g., across corresponding angles of each subset). For example, the processor may phase shift all left HRTFs of the first subset of pairs of HRTFs such that phase differences between the left HRTFs of the first subset and left HRTFs of the second subset of pairs of HRTFs are the same, and similarly, phase shift all of the right HRTFs of the second subset of pairs of HRTFs such that phase differences between the right HRTFs of the second subset and right HRTFs of the first subset of pairs of HRTFs with are the same. In one aspect, the HRTFs may be processed such that their respective phase differences are the same for only corresponding angles. For example, a pair of HRTFs that correspond to −30° and another pair of HRTFs that correspond to +30° may be processed such that phase for both ipsilateral filters of the pairs are the same, while phase differences between both ipsilateral and contralateral filters of the filters are also the same, as described herein.

Additionally or alternatively, in one aspect, the HRTF processor 36 may process HRTFs as a function of angle (e.g., azimuth and/or elevation) across at least a portion of a HRTF dataset. In particular, HRTFs associated with angles that extend beyond a set of angles that are associated with sound sources used to produce the virtual phantom center may be processed less by the HRTF processor. For example, as described herein, processing HRTFs at wider angles for hard-panned sound sources may result in sound from those sources being less precise. Thus, the processing of these wider angle HRTFs may be reduced to make these sound sources clearer to the listener. Specifically, the HRTF processor may process a first portion of the HRTF dataset to remove comb filtering effects during audio playback for a first subset of angles, and process a second portion of the HRTF dataset to localize hard-panned left sound sources or hard-panned right sound sources for a second subset of angles. In other aspects, the HRTF processor may process a first portion of the HRTF dataset to remove comb filtering effects during audio playback only for a first subset of angles, while not applying further processing on the second portion of the HRTF dataset.

In one aspect, the HRTF dataset may be processed based on angles at which sound sources are positioned in order to spatialize the phantom center. For example, the first portion of the HRTF dataset may be processed for a first subset of angles that may be between symmetrical angles about a 0° axis that extends forward from a point of reference. In one aspect, the first subset of angles may be between +θ and −θ, as shown in FIG. 1. In some aspects, the angles may be narrow angles (e.g., less than or within +/−45° from the axis). In another aspect, the angles may be narrower, such as between +30° and −30°. Specifically, pairs of HRTF that are located within this range of (e.g., azimuth and/or elevation) angles, may be processed by applying one or more phase shifts, as described herein. In one aspect, the crossover frequency, the frequency at which the phase between one or more HRTFs is shifted may change with respect to azimuth and/or elevation angle. For example, as the angle moves towards 0° (e.g., from −θ and/or from +θ), the crossover frequency may increase. In one aspect, the crossover frequency may increase as the angle increases (e.g., from +θ and away from 0°) and/or decreases (e.g., from +θ and toward 0°). In one aspect, the crossover frequency may increase proportionally as the angle becomes narrower. In some aspects, the crossover frequency at +θ and −θ may be between 900 Hz to 1,600 Hz, as described herein.

As described herein, the HRTF processor 36 may process a second portion of the HRTF dataset to localize hard-panned sound sources for a second subset of angles. Specifically, to localize sound sources, the processor may reduce (or eliminate) processing (e.g., using one or more audio signal processing operations described herein) pairs of HRTFs as a function of angles associated with the HRTFs. For example, the HRTF processor may change the crossover frequency with respect to angles in the second subset of angles. In one aspect, the second subset of angles may be wider angles than the first subset of angles. For example, the second subset of angles may be between +φ and +θ, and −φ and −θ, where φ may be any angle greater than θ. In one aspect, when φ is 90°, such that the second subset of angles may be between +90° and +30, and between −90° and −30°. In which case, as angles of the second subset extend beyond θ, the phase crossover frequency increases. In one aspect, the crossover frequency may increase proportionally. In some aspects, the phase crossover frequency at +φ and −φ may be between 2,600 Hz to 3,400 Hz. In one aspect, the angles described herein may be azimuth angles. In another aspect, the angles may be elevation angles. As a result, the change in phase crossover frequency may correspond to similar changes to elevation angles.

As described herein, the HRTF processor may apply, to at least some HRTFs, a gain to increase the magnitude of the HRTF at a frequency range. In one aspect, the application of the gain to the second portion of the HRTF data set may be a function of the second subset of angles. Specifically, the applied gain may decrease as the second subset of angles moves away from +/−θ. In one aspect, the processor may cease applying the gain at +/−φ. In another aspect, the HRTF processor 36 may change target phase differences between at least some HRTFs as the second subset of angles moves away from +/−θ. For instance, the phase difference between (e.g., symmetrically positioned with respect to a 0° axis) HRTFs (e.g., between ipsilateral and contralateral filters) may increase as the second subset of angles moves away from +/−θ and towards +/−φ, respectively. For example, the phase difference of pairs of HRTFs at +/−θ may be 0, while the phase difference of pairs of HRTFs at +/−φ may be 180°.

As described herein, the HRTF processor 36 may apply a gain to one or more HRTFs of the HRTF data (e.g., as a function of angles) in order to resolve an issue of preciseness for hard-panned sound sources that are spatially rendered using the processed (phase shifted) HRTFs. In addition to (or in lieu of) applying the gain, the HRTF processor may apply an attenuation to one or more HRTFs. Specifically, the processor may apply an attenuation to contralateral filters in order to add one or more notches to the combined response of the contralateral and ipsilateral signals. For example, with respect to the first and second subset of pairs of HRTFs, the processor may apply an attenuation to each right HRTF of the second subset of pairs of HRTFs (that spatialize sound sources for left-sided angles) and/or may apply the (e.g., same) attenuation to each left HRTF of the first subset of pairs of HRTFs (that spatialize sound sources for right-sided angles). In one aspect, the attenuation may be between 3 dB to 6 dB.

Figure 4:
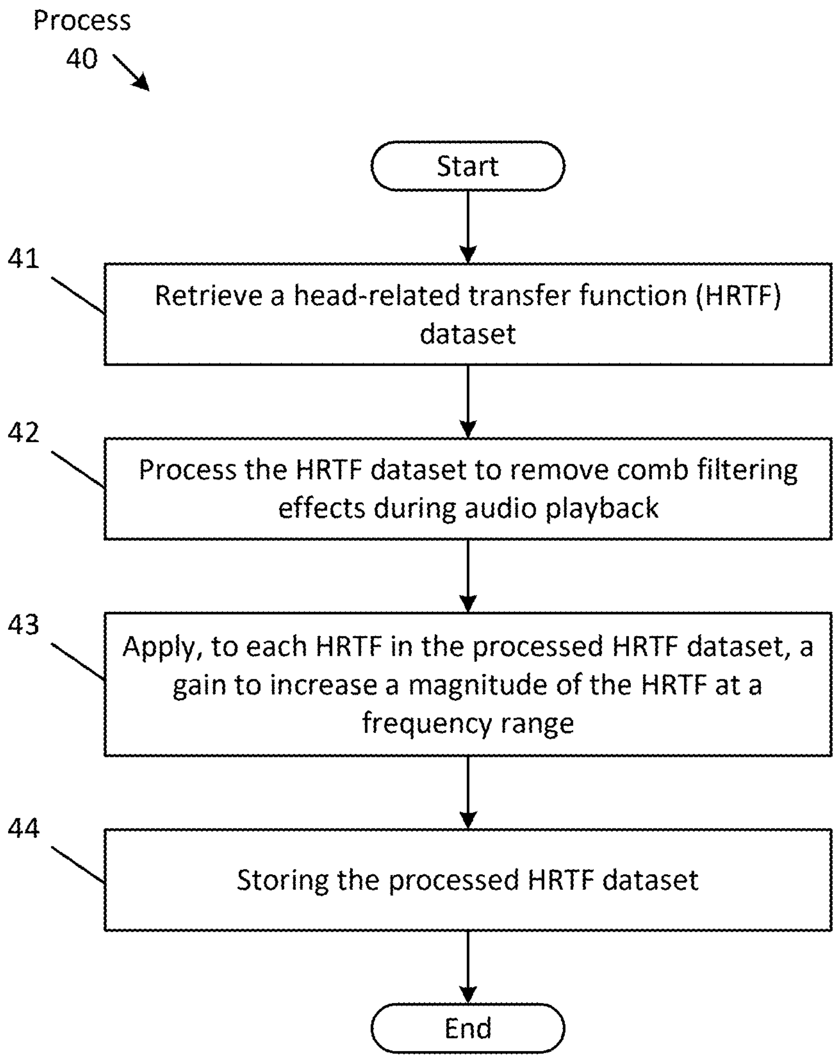
FIG. 4 is a flowchart of one aspect of a process for processing HRTFs to eliminate the effects of comb filtering during audio playback according to one aspect.
Figure 5:
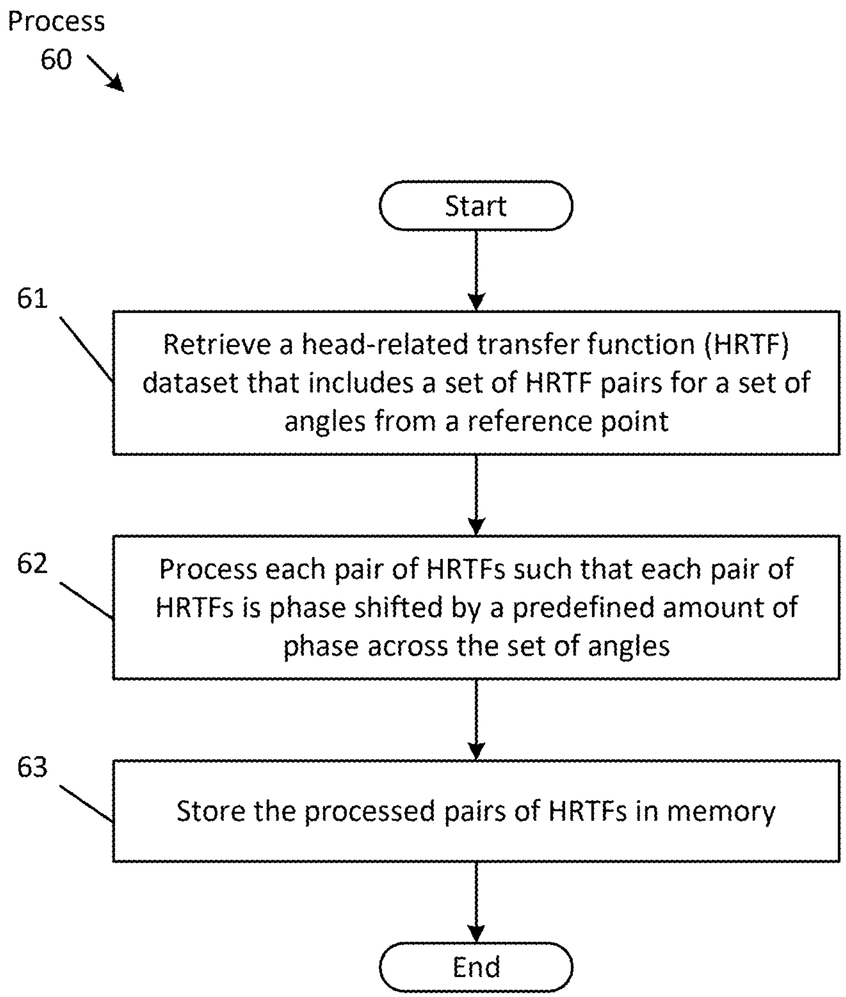
FIG. 5 is a flowchart of another aspect of a process for processing HRTFs to eliminate the effects of comb filtering during audio playback according to another aspect.
Figure 6:
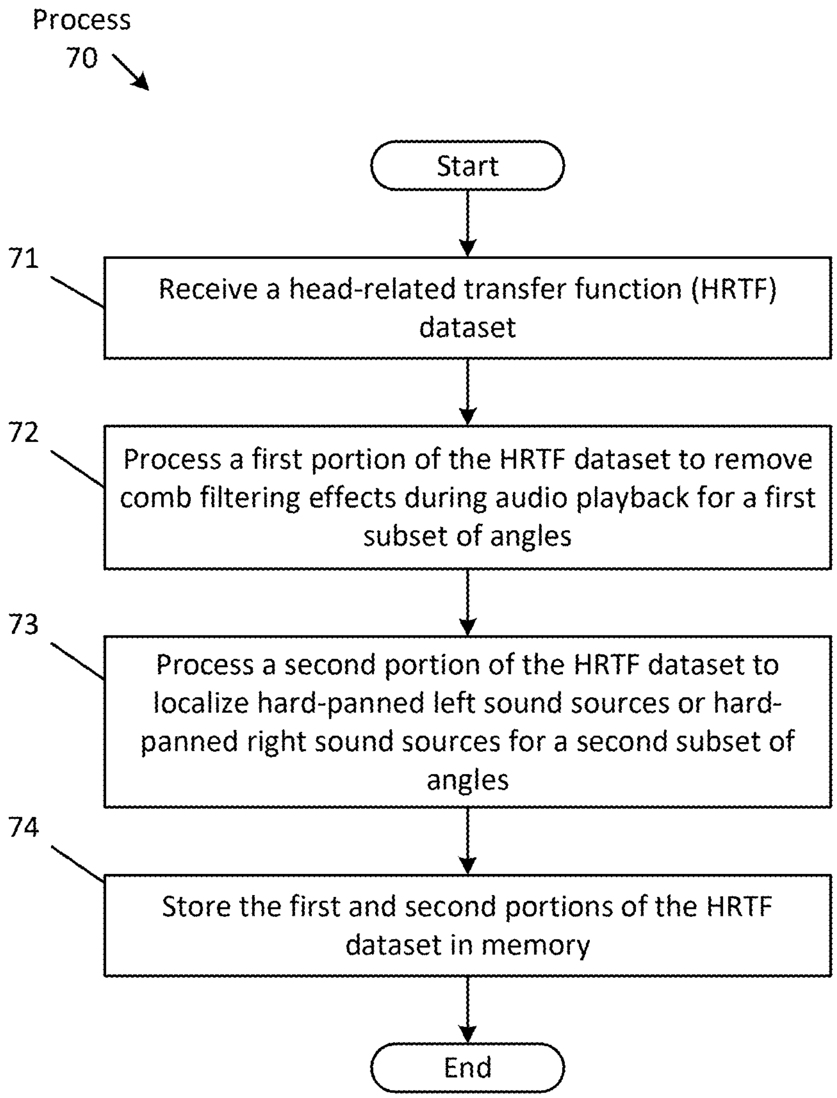
FIG. 6 is a flowchart of another aspect of a process for processing HRTFs to eliminate the effects of comb filtering during audio playback according to another aspect.

FIGS. 4-6 are flowcharts of processes 40, 60, and 70, respectively, for performing one or more operations for processing one or more HRTFs of a dataset to reduce (or eliminate) comb filtering effects while using the processed HRTFs to spatially render a virtual phantom center. In one aspect, at least some of the operations may be performed by one or more devices of the system 20, as illustrated in FIG. 2. For instance, at least some of the processes may be performed by (e.g., the server software program 34 that is executed by one or more processors 32 of) the server 21. In another aspect, at least some of the operations may be performed by the playback device while audio content is being spatially rendered, as described herein.

FIG. 4 is a flowchart of one aspect of a process 40 for processing HRTFs to eliminate the effects of comb filtering during audio playback according to one aspect. The process 40 begins by the server 21 retrieving a HRTF dataset from memory (at block 41). Specifically, the HRTF processor 36 has retrieved a dataset from the database 35 from memory 33. In one aspect, the retrieved HRTF dataset may be a generic or a personalized dataset. The server processes (at least a portion of) the HRTF dataset to remove comb filtering effects during audio playback (at block 42). For instance, the HRTF processor may phase shift one or more HRTFs (e.g., by applying one or more all-pass filters to the HRTFs across one or more frequency ranges). The server applies, to each HRTF in the processed HRTF dataset, a gain to increase a magnitude of the HRTF at a frequency range (at block 43). For instance, the server may apply a gain between 3 dB and 6 dB between 900 Hz and 1,600 Hz. The server then stores the processed HRTF dataset in memory (at block 44).

FIG. 5 is a flowchart of one aspect of a process 60 for processing HRTFs to eliminate the effects of comb filtering. The process 60 begins by the server 21 retrieving a HRTF dataset that includes a set of HRTF pairs (e.g., one left HRTF and one right HRTF) for a set of angles from a reference point (at block 61). The server processes each pair of HRTFs (of the retrieved dataset) such that each pair is phase shifted by a predefined amount of phase across the set of HRTFs (at block 62). For example, one or more contralateral filters of (at least some) right-sided HRTFs may be phase shifted with respect to ipsilateral filters of (at least some corresponding) left-sided HRTFs. For example, a left HRTF of a right-sided pair of HRTFs may be phase shifted with respect to a left HRTF of a left-sided pair of HRTFs, such that both left HRTFs are out-of-phase (e.g., by 90°). The server stores the processed pairs of HRTFs in memory (at block 63).

FIG. 6 is a flowchart of one aspect of a process 70 for processing HRTFs to eliminate the effects of comb filtering. The process 70 begins by the server receiving a (e.g., unprocessed) HRTF dataset (at block 71). The server processes a first portion of the HRTF dataset to remove comb filtering effects during audio playback for a first subset of angles (at block 72). For example, the HRTF processor may apply one or more phase shifts (e.g., by applying one or more all-pass filters) across one or more angles, such as between +θ and −θ, as described herein. The server processes a second portion of the HRTF dataset to localize hard-panned left sound sources or hard=panned right sound sources for a second subset of angles (at block 73). Specifically, to localize the hard-panned sound sources, the server may reduce (or eliminate entirely) the use of one or more audio signal processing that was used to process the first portion to remove the comb filtering effects during playback. The server stores the first and second portions of the HRTF dataset in memory (at block 74).

Some aspects may perform variations to the processes 40, 60, and/or 70. For example, the specific operations may not be performed in the exact order shown and described. The specific operations may not be performed in one continuous series of operations and different specific operations may be performed in different aspects. In one aspect, the server may perform other operations described herein, such as processing one or more pairs of HRTFs by applying one or more phase shifts (e.g., by applying one or more all-pass filters) between one or more HRTFs. In another aspect, the operations described herein may be functions of angles of the HRTFs. For instance, the processing of the HRTFs and the applying of the gains may be performed as a function of angle, as described herein.

As described herein, at least some of the operations of the above-mentioned processes may be performed by the server 21. In another aspect, at least some of the operations may be performed by other devices, such as the playback device 23 of system 20. For example, the playback device may receive the processed HRTF dataset and apply one or more audio signal processing operations, such as applying the gain. Once processed, the HRTF dataset may be stored in local memory of the playback device, for use during spatial audio playback.

FIG. 7 shows an example of the system 20 that is using one or more processed HRTFs to eliminate the comb filtering effect during reproduction of spatial audio with a virtual phantom center 51. Specifically, this figure shows the listener 1 wearing the output device 24, which is illustrated as over-the-ear headphones, and listening to a spatial reproduction of an audio signal in which two virtual speakers 50 and 52 are spatialized, creating the virtual phantom center 51. Thus, this figure is showing a spatially rendering of the phantom center 4 (similar or as) shown in FIGS. 1*a* and 1*b*.

As shown, the playback device 23 includes a controller 53 that may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform audio signal processing operations and/or networking operations.

The controller includes one or more operational blocks, which include a spatial renderer 54 and processed HRTFs 55. In one aspect, the processed HRTFs may include at least a portion of the HRTF dataset that was processed by the server 21, as described in FIGS. 3 and 4. Specifically, the controller may be configured to retrieve the processed HRTFs (e.g., via Network 22) from the server 21, and store the processed HRTFs in memory (e.g., of the controller 53).

The spatial renderer 54 is configured to receive one or more audio signals and is configured to produce a spatial audio reproduction of the one or more audio signals for playback by the output device. In one aspect, the audio signals may include spatial characteristics (e.g., azimuth, elevation, frequency, etc.) that indicates a position in space at which sound of the one or more audio signals is to be reproduced (e.g., as a virtual sound source), and with which one or more processed HRTFs 55 are selected for spatially rendering the one or more audio signals. The spatial renderer uses the one or more processed HRTFs to produce binaural audio signals, a left binaural audio signal and a right binaural audio signal, which when output through respective speakers produces a 3D sound (e.g., giving the listener the perception that sounds are being emitted from particular locations within an acoustic space).

In one aspect, the one or more audio signals may be received as audio data in any audio format as a representation of one or more sound sources of which the spatial renderer may produce a spatial reproduction using one or more processed HRTFs 55. For example, the audio data may include an angular/parametric reproduction of the virtual sound source, such as Higher Order Ambisonics (HOA) representation of a sound space that includes the sound (e.g., positioned at a virtual position within the space), a Vector-Based Amplitude Panning (VBAP) representation of the sound, etc. In another aspect, the audio data may include a channel-based reproduction of one or more sounds, such as multi-channel audio in a surround sound multi-channel format (e.g., 5.1, 7.1, etc.). In some aspects, the audio data may include an object-based representation of the sound that includes one or more audio channels that has (at least a portion of) the sound and metadata that describes the sound. For instance, the metadata may include the spatial characteristics of the sound.

As shown, the output device 24 is receiving the left and right binaural signals produced by the playback device, and is using the signals to drive respective speakers that are integrated within the output device. Specifically, the output device is using the binaural signals for spatial audio playback in which a virtual phantom center 51 is being created in front of the listener 1, as a result of two virtual speakers 50 and 52 that are being spatially rendered at angles +/−θ. In one aspect, both of these virtual speakers may be a spatial reproduction of an audio signal (or two or more audio signals that are at least partially coherent) using two pairs of HRTFs with symmetric spatial characteristics (e.g., having +/−θ as respective azimuth angles). As a result of using the processed HRTFs, the frequency response at the listeners left ear 57 is (approximately) a flat response, as opposed to the frequency response 7 of FIG. 1*b* that includes many notches and peaks that cause comb filtering effects. In one aspect, the frequency response at the listeners left ear may be similar or the same as response 57 (e.g., being void of the comb filtering effects).

In one aspect, the processed HRTFs may be used to spatially render one or more audio signals as virtual sound sources at any location about the listener (or a reference point). As described herein, the HRTFs used by the playback device may be processed according to their respective spatial characteristics (e.g., angle from a 0°-axis). Thus, for audio signals that are to be hard-panned to the left (e.g., at a +90°), the playback device may use a less processed HRTF (e.g., having less applied gain), than the HRTF that was used to spatially render the virtual left speaker 50 at +θ (which may be at +30°, for example).

In one aspect, the system 20 may include one or more sensors (not shown) that are arranged to track head movement of the listener 1. For example, the output device 24 may include one or more inertial measurement unit (IMU) sensor that measures acceleration and/or angular velocity of the output device. From the sensor data of the IMU sensor the output device may determine whether the listener's head has rotated, upon which the output device may transmit a control signal to the playback device indicating the rotation. Using the control signal, the controller 53 may adjust the spatial rendering by selecting one or more different processed HRTFs based on the listener's head movement.

In one aspect, each pair of HRTFs is phase shifted above a particular frequency. In some aspects, the second subset of angles is between +90° and +30°, and between −90° and −30°. In another aspect, the applied gain to the second portion of the HRTF dataset as a function of the second subset of angles.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

As previously explained, an aspect of the disclosure may be a non-transitory machine-readable medium (such as microelectronic memory) having stored thereon instructions, which program one or more data processing components (generically referred to here as a "processor") to perform the network operations, spatial rendering operations, and audio signal processing operations, as described herein. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A method performed by one or more programmed processors of a first electronic device, the method comprising:

retrieving a head-related transfer function (HRTF) dataset from memory;

processing the HRTF dataset to remove comb filtering effects during spatial audio playback;

producing a gain-adjusted HRTF dataset by applying, to each HRTF in the processed HRTF dataset, a gain to increase a magnitude of the HRTF at a frequency range; and providing the gain-adjusted HRTF dataset to a second electronic device that is configured to use at least two HRTFs from the gain-adjusted HRTF dataset to spatially render audio content at a virtual phantom center through a headset, wherein the use of the at least two HRTFs results in a flat response at each ear of a user who is wearing the headset, wherein an average response across at least a subset of the processed HRTF dataset include at least a portion of the gain increase across the frequency range.

2. The method of claim 1, wherein the gain is between 3 dB and 6 dB.

3. The method of claim 1, wherein the frequency range is between 900 Hz and 1,600 Hz.

4. The method of claim 1, wherein the gain is applied to each HRTF in the frequency range.

5. The method of claim 1, wherein the gain increase to the average response is equal or less than the gain applied to each HRTF in the processed HRTF dataset.

6. A method performed by one or more processors of a server, the method comprising:

retrieving a head-related transfer function (HRTF) dataset that includes a first plurality of HRTF pairs for right-sided angles with respect to a reference axis and a second plurality of HRTF pairs for left-sided angles with respect to the reference axis, wherein each pair comprises a left HRTF and a right HRTF;

applying phase shift to each pair of HRTFs in the first and second pluralities of HRTF pairs with respect to all other pairs of HRTFs in its respective plurality of HRTF pairs or the other plurality of HRTF pairs to remove comb filtering effects during spatial audio playback;

storing the pairs of HRTFs in memory; and transmitting, over a computer network, at least some of the phase shifted pairs of HRTFs to a playback device that is configured to use at least two pairs of HRTFs to spatially render audio content to create a virtual phantom center through a headset, wherein the use of the at least two pairs of HRTFs results in a flat response at an ear of a user who is wearing the headset.

7. The method of claim 6, wherein applying phase shift comprises:

creating a first set of phase-shifted HRTF pairs in which each pair of HRTFs is out-of-phase by a first threshold; and creating a second set of phase-shifted HRTF pairs in which each pair of HRTFs is out-of-phase by a second threshold that is greater than the first threshold.

8. The method of claim 7, wherein sound produced during spatial audio playback according to the first set of phase-shifted HRTF pairs has a greater sound level than a sound level of sound produced during spatial audio playback according to the second set of phase-shifted HRTF pairs.

9. The method of claim 7, wherein the first threshold is 90°.

10. The method of claim 9, wherein the second threshold is 180°.

11. The method of claim 6, wherein applying phase shift comprises:

shifting phase of a first subset of the first plurality of HRTF pairs that are associated with a first range of angles by a first threshold; and shifting phase of a second subset of the second plurality of HRTF pairs that are associated with a second range of angles by a second threshold, wherein the first range of angles and the first threshold are different than the second range of angles and the second threshold, respectively.

12. The method of claim 6, wherein phase shift is applied such that phase of all right HRTFs of the first plurality of HRTF pairs are the same for the right-sided angles, and such that phase of all left HRTFs of the second plurality of HRTF pairs are the same for the left-sided angles.

13. The method of claim 6, wherein applying phase shift comprises processing all left HRTFs of the first plurality of HRTF pairs to maintain relative phase between all right HRTFs and all left HRTFs of the first plurality of HRTF pairs, and processing all right HRTFs of the second plurality of HRTF pairs to maintain relative phase between all left HRTFs and all right HRTFs of the second plurality of HRTF pairs.

14. The method of claim 6, wherein applying phase shift comprises:

phase shifting all left HRTFs of the first plurality of HRTF pairs such that phase differences between the left HRTFs of the first plurality of HRTF pairs and left HRTFs of the second plurality of HRTF pairs are the same; and phase shifting all right HRTFs of the second plurality of HRTF pairs of such that phase differences between the right HRTFs of the second plurality of HRTF pairs and right HRTFs of the first plurality of HRTF pairs are the same.

15. The method of claim 6, wherein each pair of HRTFs is phase shifted above a frequency range of 800 Hz to 1,400 Hz.

16. A method comprising:

receiving a head-related transfer function (HRTF) dataset;

processing a first portion of the HRTF dataset to remove comb filtering effects during spatial audio playback for a first subset of angles;

processing a second portion of the HRTF dataset differently than the first portion of the HRTF dataset to localize hard-panned left sound sources or hard-panned right sound sources for a second subset of angles; and transmitting the first and second processed portions of the HRTF dataset to an electronic device that is configured to use at least two HRTFs of the first processed portion of the HRTF dataset to spatially render audio content to generate a virtual phantom center through a headset, wherein the use of the at least two HRTFs results in a flat response at an ear of a user who is wearing the headset.

17. The method of claim 16, wherein the first subset of angles is between +30° and −30°.

18. The method of claim 16, wherein the second subset of angles is between +90° and +30°, and between −90° and −30°, wherein processing the second portion of the HRTF dataset differently comprises increasing a target phase difference between at least some HRTFs of the second portion of the HRTF dataset when the subset of angles moves between +90° and +30°, and between −90° and −30°.

19. The method of claim 16 further comprising applying, to each HRTF of the second portion of the HRTF dataset, gain as a function of the second subset of angles.

20. The method of claim 16 further comprising increasing phase crossover frequency for the second subset of angles.

21. The method of claim 16 further comprising changing phase crossover frequency based on a set of elevation angles.

22. The method of claim 16, wherein the HRTF dataset includes pairs of HRTFs comprising a first subset of pairs of HRTFs for right-sided angles with respect to a reference point and a second subset of pairs of HRTFs for a left-sided angles with respect to the reference point, wherein each pair of HRTFs comprises a left HRTF and a right HRTF, and wherein the method further comprises applying an attenuation to each right HRTF of the second subset of pairs of HRTFs and applying the attenuation to each left HRTF of the first subset of pairs of HRTFs.

* * * * *